US010216157B2

(12) United States Patent
Savage et al.

(10) Patent No.: US 10,216,157 B2
(45) Date of Patent: Feb. 26, 2019

(54) ORDER FULFILLMENT SYSTEM AND METHOD

(71) Applicants: Benjamin V. Savage, Loveland, OH (US); Kent V. Savage, Morrow, OH (US)

(72) Inventors: Benjamin V. Savage, Loveland, OH (US); Kent V. Savage, Morrow, OH (US)

(73) Assignee: APEX INDUSTRIAL TECHNOLOGIES LLC, Mason, OH (US)

(*) Notice: Subject to any disclaimer, the term of this patent is extended or adjusted under 35 U.S.C. 154(b) by 0 days.

(21) Appl. No.: 14/991,231

(22) Filed: Jan. 8, 2016

(65) Prior Publication Data

US 2016/0200517 A1    Jul. 14, 2016

Related U.S. Application Data

(60) Provisional application No. 62/101,717, filed on Jan. 9, 2015.

(51) Int. Cl.
| | | |
|---|---|---|
| *G07F 17/12* | (2006.01) | |
| *G05B 15/02* | (2006.01) | |
| *G06Q 50/12* | (2012.01) | |

(52) U.S. Cl.
CPC ............ *G05B 15/02* (2013.01); *G06Q 50/12* (2013.01); *G07F 17/12* (2013.01)

(58) Field of Classification Search
CPC ....... G07F 17/0092; G07F 17/12; G07F 17/10
USPC ......................................... 700/242; 312/215
See application file for complete search history.

(56) References Cited

U.S. PATENT DOCUMENTS

| | | | |
|---|---|---|---|
| 4,006,821 A | 2/1977 | Sautter | |
| 4,982,948 A | 1/1991 | Burger et al. | |
| 5,020,719 A | 6/1991 | Roth et al. | |
| 5,303,844 A | 4/1994 | Muehlberger | |
| 5,385,265 A * | 1/1995 | Schlamp | G07F 7/00 700/242 |
| 6,464,142 B1 * | 10/2002 | Denenberg | G07F 17/0092 235/440 |

(Continued)

FOREIGN PATENT DOCUMENTS

CN          103735059 A    4/2014

OTHER PUBLICATIONS

U.S. Patent and Trademark Office, as International Searching Authority, International Search Report and Written Opinion, International Application No. PCT/US2018/033361, 9 pages, dated Aug. 27, 2018.

*Primary Examiner* — Timothy R Waggoner
(74) *Attorney, Agent, or Firm* — Thompson Hine LLP (57) ABSTRACT

An order fulfillment system including a frame defining a passageway and a tray positioned in the passageway. The tray is movable between a first extended position wherein the tray is positioned at least partially outside the frame on a first side thereof and a second extended positioned wherein the tray is positioned at least partially outside the frame on a second, opposite side thereof. The tray includes a panel configured to generally block the passageway when the panel is positioned in or adjacent to the passageway. The system further includes a controller configured to selectively allow or block movement of the tray to or from at least one of the first or second extended positions.

34 Claims, 6 Drawing Sheets

(56) References Cited

U.S. PATENT DOCUMENTS

| | | | |
|---|---|---|---|
| 6,616,010 B2* | 9/2003 | Yuyama | G06K 17/0022 |
| | | | 221/197 |
| 6,701,218 B2* | 3/2004 | Koike | G07F 17/0092 |
| | | | 700/235 |
| 7,077,286 B2 | 7/2006 | Shows et al. | |
| 7,747,477 B1* | 6/2010 | Louie | G06Q 10/0833 |
| | | | 235/385 |
| 9,135,403 B1* | 9/2015 | Tolmosoff | G06F 19/3462 |
| 9,322,207 B2 | 4/2016 | Savage et al. | |
| 9,532,666 B2 | 1/2017 | Savage et al. | |
| 9,557,209 B2 | 1/2017 | Savage et al. | |
| 9,663,974 B2 | 5/2017 | Savage et al. | |
| 9,694,488 B2 | 7/2017 | Savage et al. | |
| 2001/0042024 A1* | 11/2001 | Rogers | G06Q 10/0637 |
| | | | 705/26.81 |
| 2004/0131505 A1 | 7/2004 | Koeda | |
| 2005/0021175 A1* | 1/2005 | Bain | G06F 19/3462 |
| | | | 700/236 |
| 2010/0301716 A1 | 12/2010 | Ranitlla | |
| 2012/0153783 A1* | 6/2012 | Shoenfeld | A61L 2/10 |
| | | | 312/209 |
| 2012/0200385 A1 | 8/2012 | Savage et al. | |
| 2015/0153218 A1 | 6/2015 | Savage et al. | |
| 2015/0366377 A1 | 12/2015 | Savage et al. | |
| 2016/0053514 A1 | 2/2016 | Savage et al. | |
| 2016/0208543 A1 | 7/2016 | Savage et al. | |

\* cited by examiner

ORDER FULFILLMENT SYSTEM AND METHOD

This application claims priority to U.S. Provisional Patent Application Ser. No. 62/101,717, entitled Order Fulfillment System and Method and filed on Jan. 9, 2015, the entire contents of which are hereby incorporated by reference.

BACKGROUND

This current disclosure is directed to an order fulfillment system, and more particularly, to an order fulfillment system which provides selective and/or controlled access to the contents thereof.

Sellers of various goods, such as retail operations, grocery stores, restaurant/food service and other sales and/or delivery operations are increasing utilizing self-service pick-up options for goods. The orders for such goods can in some cases be placed remotely and by any of a variety of methods, such as call-ahead, internet/web site ordering and/or mobile device ordering. Some retailers/operations accommodate pre-payment such that the customer need only provide proof of purchase before taking possession of the purchased items. Such pre-payment can avoid the need for on-site interaction with or monetary exchange with store personnel.

Efficiently fulfilling these remotely-initiated orders for in-store pickup can create a logistical challenge. In some existing settings, remote-order customers must wait in line with other customers upon arrival at the store, despite the fact that their orders are already prepared and ready for pick-up. In addition, when a remote-order customer reaches the point of sale workstation, the cashier may be required to step away from the workstation to retrieve the order and confirm payment status before locating and delivering the appropriate product to the customer. This increases wait time for all customers. In some cases, businesses may increase staffing to provide fulfilment of such remote orders with dedicated personnel, which can impose a burden on store resources.

SUMMARY

In one embodiment the present invention is an order fulfillment system which enables efficient distribution of goods. More particularly, in one embodiment the invention is an order fulfillment system including a frame defining a passageway and a tray positioned in the passageway. The tray is movable between a first extended position wherein the tray is positioned at least partially outside the frame on a first side thereof and a second extended positioned wherein the tray is positioned at least partially outside the frame on a second, opposite side thereof. The tray includes a panel configured to generally block the passageway when the panel is positioned in or adjacent to the passageway. The system further includes a controller configured to selectively allow or block movement of the tray to or from at least one of the first or second extended positions.

DETAILED DESCRIPTION

The order fulfillment system disclosed herein can be utilized to enable or facilitate the transfer of any of a variety of products, items or the like. The system can be utilized in conjunction with nearly any type of product, item or the like so long as such product, item or the like can be physically accommodated in the system, including but not limited to, food, beverages, groceries, pharmaceuticals, retail merchandise, parts, components, work pieces, hardware, and the like. In one case a product, item or the like is transferred from or between two users or parties, termed a "stocking" party and a "retrieving" party herein. In many cases title/ownership of the product, item or the like is being, has been or will be transferred from the stocking party to the retrieving party, such as in a sale transaction. However, the system may also be used in some cases in a lending or leasing arrangement and/or to return a product to the stocking party in a return transaction, and/or title may not necessary transfer.

Figure 1:
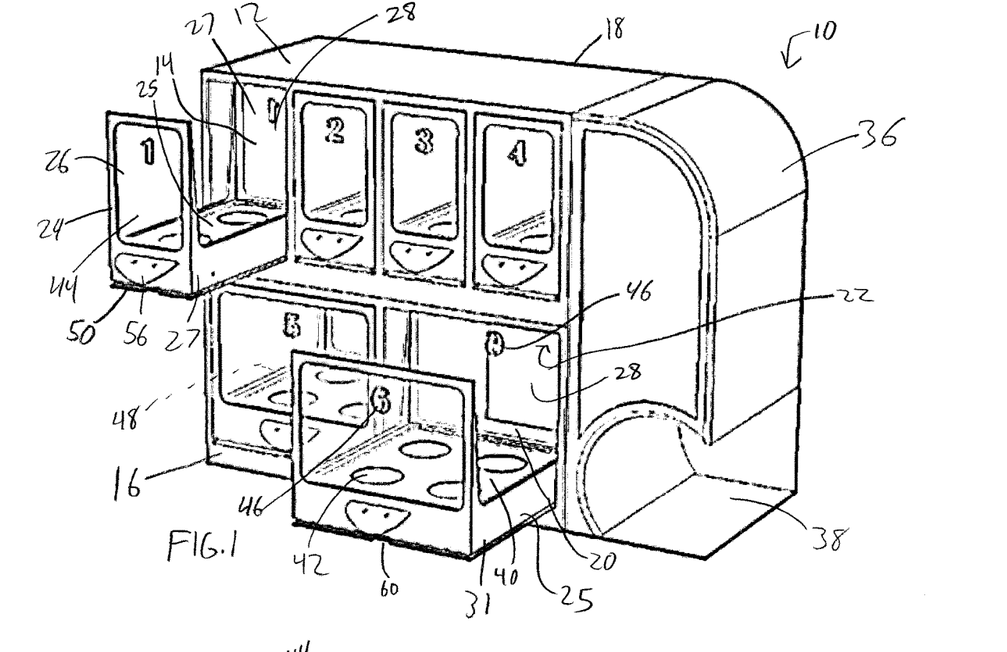
FIG. 1 is a front perspective view of one embodiment of an order fulfillment system.
Figure 2:
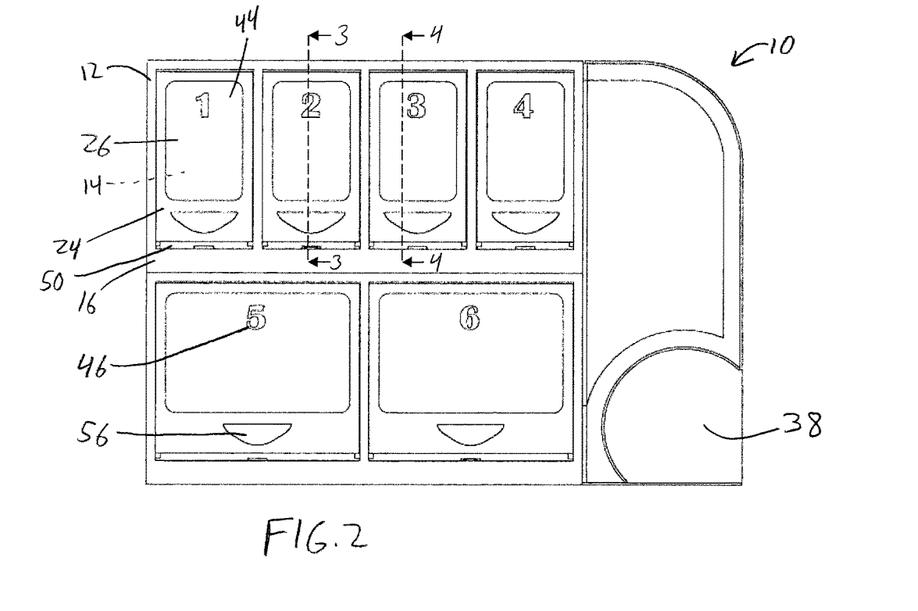
FIG. 2 is a front view of the system of FIG. 1.
Figure 12:
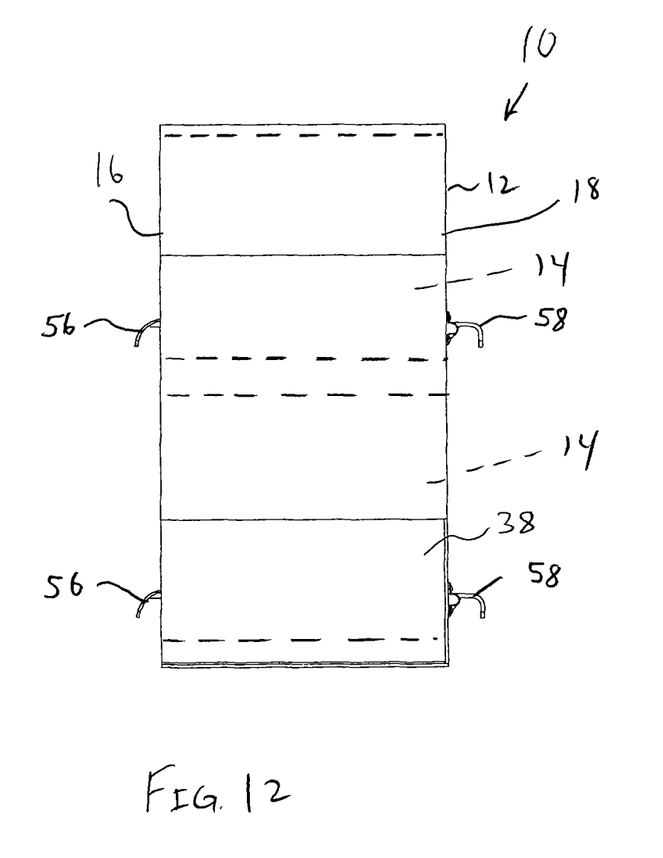
FIG. 12 is a side view of the system of FIG. 1.

With reference to FIGS. 1, 2, and 12, in one embodiment the order fulfillment system 10 includes a frame 12 that defines one or more compartments or passageways 14 therethrough. Each compartment or passageway 14 can extend an entire thickness of the frame 12 between a retrieval side 16 and a stocking side 18 thereof. Each passageway 14 has or terminates at an end or opening 20 on the retrieval side 16 of the frame 12 and an end or opening 22 on the stocking side 18 thereof. A tray 24 can be movably positioned within each passageway 14.

In one embodiment, the frame 12 is a unitary housing component with a plurality of passageways 14 for a plurality of trays 24. Alternately, each tray 24 may have its own individually-associated frame 12. The various passageways 14 may have the same or different shapes or dimensions, as appropriate for the products to be transferred. In one embodiment, the passageways 14 are generally rectangular in cross section and are between about 3 and about 24 inches wide, between about 6 and about 24 inches high, and/or between about 6 and about 24 inches deep. The passageways 14 may alternately have any of a variety of other shapes or dimensions as appropriate for the products to be transferred. The system 10/frame 12 may include or be coupled to any of a variety of systems or devices for adjusting conditions inside the system 10/frame 12/passageways 14, such as heating devices, cooling or refrigeration devices, vents, humidifiers, dehumidifiers, systems for pressurizing and/or depressurizing, circulation and recirculating devices, etc. to control conditions within the system 10/frame 12/passageways 14 when products reside in the system 10/frame 12/passageways 14.

Figure 3:
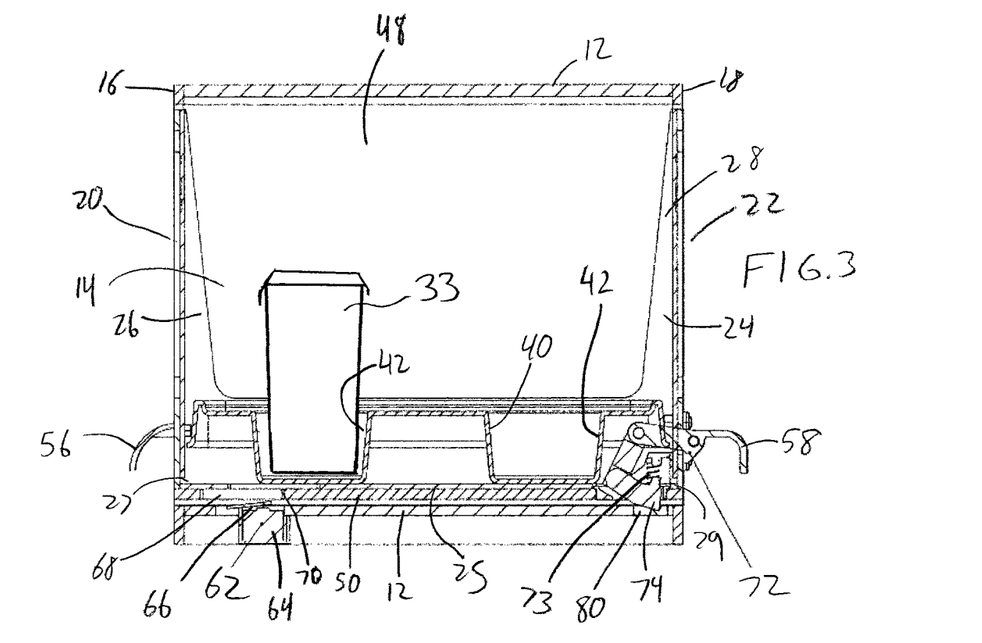
FIG. 3 is a cross section of a portion of the system of FIGS. 1 and 2, taken along line 3-3 of FIG. 2.
Figure 5:
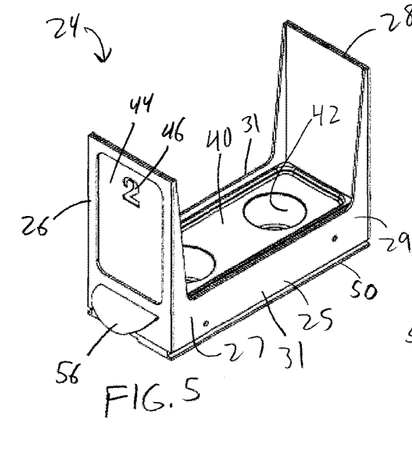
FIG. 5 is a front perspective view of a tray of the system of FIG. 1.
Figure 6:
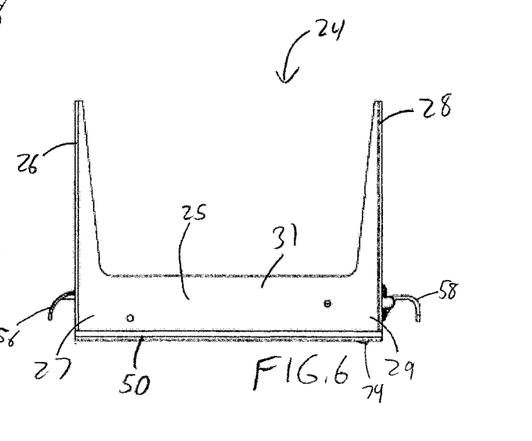
FIG. 6 is a side view of the tray of FIG. 5.

With reference to FIGS. 5 and 6, each tray 24 can include a product support surface or portion 25 that extends in the direction of the passageway 14 and is oriented generally horizontally during use. The product support portion 25 is configured to receive, and support thereon, the product 33 to be transferred from the stocking party to the retrieving party. For example, as shown in FIGS. 3 and 5, the product support portion 25 can include a generally cylindrical recess 42 configured to receive a product 33 to be dispensed therein, wherein the product 33 takes the form of a cup of coffee in the illustrated embodiment.

Each tray 24 can be movable/translatable through the associated passageway 14 within and at least partially beyond the confines/outer edges/outer perimeter of the frame 12. For example, each tray 24 can be movable to a first extended position wherein the tray 24 at least partially passes or extends through the opening 20 on the retrieval side 16. As shown in FIG. 1 the trays 24 labelled "1" and "6" are each in an extended position on the retrieval side of the frame 12. When in the first extended configuration the trays 24 provide a retrieving party access to the product support portion 25 of the tray 24 and/or products 33 stored thereon, from the retrieval side 16 of the frame 12. Each tray 24 may also be movable/translated to a second extended position wherein the tray 24 at least partially passes or extends through the opening 22 on the stocking side 18 of the frame 12. In this position the tray 24 extends beyond the frame 12 on the stocking side 18 of the frame 12. When in the second extended position on the stocking side 18, the tray 24 provides access to the support portion 25 such that a stocking party can place a product 33 thereon for retrieval by the retrieving party. It should be noted in actual order of use the tray 24 may be first moved to the "second" extended position outlined above and then moved to the "first" extended position, and thus the designation of "first" and "second" extended positions can be reversed if desired.

Figure 11:
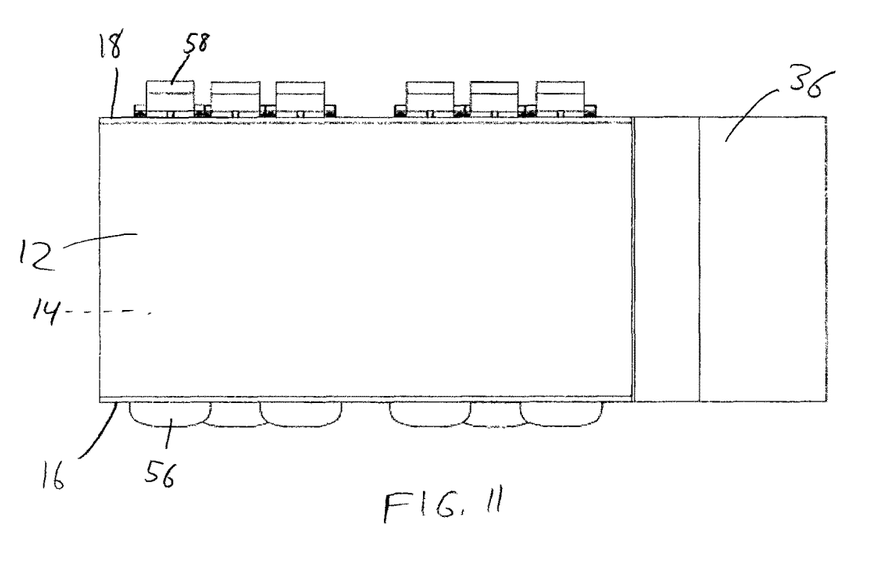
FIG. 11 is a top view of the system of FIG. 1.

The tray 24 can also be positionable in a closed or retracted position wherein, in one case, the tray 24 is centered in the frame 12 and/or the associated passageway 14 in a front to back direction. In one embodiment, the tray 24 is entirely, or generally entirely, contained within the frame 12 when in the closed position (see FIGS. 11 and 12), although in some cases portions of the tray 24 may protrude on the stocking side 18 and/or retrieval side 16. For example, the trays 24 labelled "2" through "5" in FIG. 1 are in their closed position. Each tray 24 may include a handle 56 on the retrieval side 16 and handle 58 on the stocking side 18 to facilitate manual movement of the tray 24 within the passageway 14 to or from either side 16, 18.

The tray 24 can include a pair of panels 26, 28 at each end thereof. Each panel 26, 28 is oriented generally perpendicular to the support portion 25, and oriented generally vertically in one case. Panel 26 extends from the product support portion 25 at or near an end 27 thereof. Panel 28, which is optional in some cases, extends from the product support portion 25 at or near an end 29 thereof. Panel 26 may be sized and positioned to generally block the passageway 14 and thereby restrict access to the product support portion 25 of the tray 24 (and a product 33 positioned thereon) when the panel 26 is generally aligned with the opening 20, for example when the tray 24 is in its closed position. Panel 26 can also restrict passage through the passageway 14 when the tray 24 is in its second extended position (i.e. protruding toward the stocking side 18). Conversely, when the tray 24 is in its first extended position (i.e. protruding toward the retrieval side 16, as in the case of trays "1" and "6" in FIG. 1) panel 26 is moved away from (but still aligned with) opening 20, and does not block access to the passageway 14.

Panel 28, if utilized, can also be sized and configured to be positioned in the opening 22 and generally block the passageway 14 when the tray 24 is its closed position. Panel 28 can also restrict passage through the passageway 14 when the tray 24 is in its first extended position (i.e. protruding toward the retrieval side 16, as in the case of trays "1" and "6" in FIG. 1). Conversely, when the tray 24 is in its second extended position (i.e. protruding toward the stocking side 18) panel 28 is moved away from opening 22, and does not block access to the passageway 14.

Figure 7:
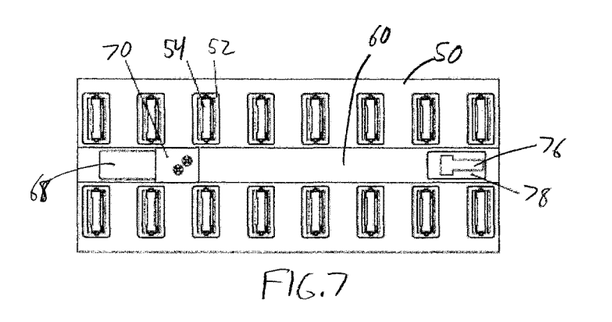
FIG. 7 is a bottom view of a roller assembly of the system of FIG. 1.

With reference to FIG. 7, the tray 24 may include a roller assembly 50 attached to a bottom surface thereof to facilitate translation of the tray 24 through the passageway 14 of the frame 12. In one embodiment, the roller assembly 50 is attached to or integral with a bottom surface of the tray 24 (see FIG. 4). Alternately, the roller assembly 50 may be attached to or integral with the frame 12 within the passageway 14. The roller assembly 50 includes a plurality of roller modules 52, where each roller module 52 contains a roller 54 oriented to permit the tray 24 to move in either direction through the passageway 14 to reach either extended position. It should be understood that the system can include any of a variety of other roller systems, bearings, low friction surfaces, sliders, rails, grooves, etc. to guide movement of the trays 24. Moreover, in some cases each tray 24 may simply be slidably positioned on a flat underlying surface.

As discussed in more detail below, the tray 24/roller assembly 50 may also include a channel 60 that runs parallel to the passageway 14 to house and/or accommodate any of a variety of mechanisms that can control or otherwise restrict free movement of the tray 24 within the passageway 14. In one embodiment, the channel 60 is generally centrally located within the roller assembly 50.

Figure 4:
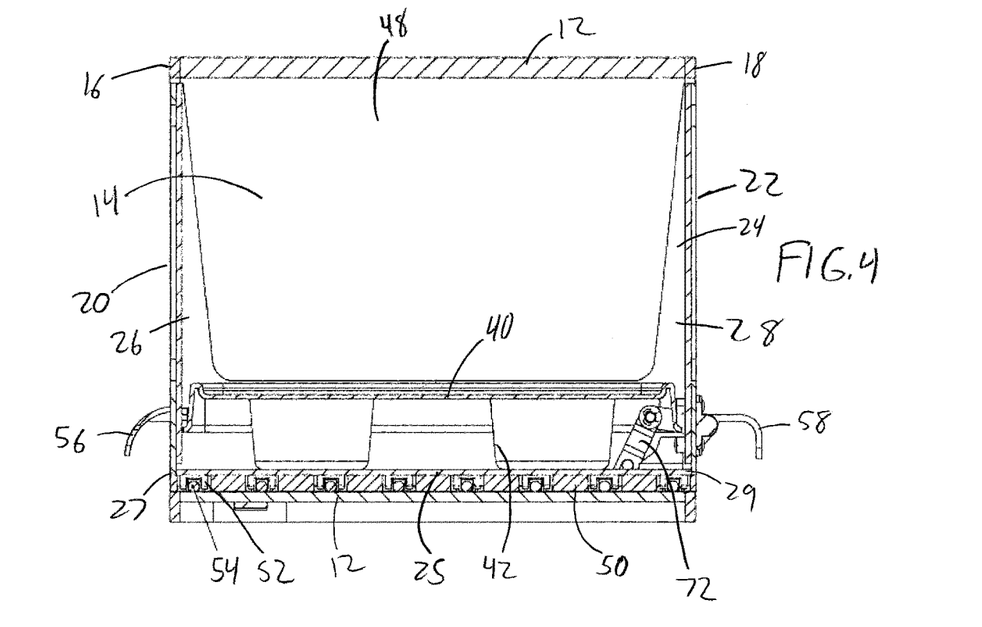
FIG. 4 is a cross section of a portion of the system of FIGS. 1 and 2, taken along line 4-4 of FIG. 2.

Referring now to FIGS. 3-6, one embodiment of a tray 24 is shown in greater detail. In the embodiment of FIGS. 3 and 4, the support portion 25 has a length approximately equal to or slightly shorter than a length of the passageway 14 in which it is positioned. However, in some cases the support portion 25 can have a length greater than a length of the passageway 14 such that the support portion 25 extends beyond and edge of one or both of the openings 20, 22 to provide ease of gripping. In one embodiment, the panels 26, 28 extend generally perpendicularly to the direction of movement/translation of the tray 24 within the passageway 14. The panels 26, 28 may be shaped and sized to generally match the cross-sectional size and/or shape of the passageway 24 and/or the associated openings 20, 22. Accordingly, when the tray 24 is in the closed position, in one case the panels 26, 28 generally align with their associated opening 20, 22, and both openings 20, 22 (and/or the passageway 14) are generally filled or blocked (e.g. in one case, at least about 80%, or in another case at least about 90%, of the surface area of each opening 20, 22 or passageway 14 is blocked, and/or no gaps or openings are provided about the panels 26, 28 that have a height (or greatest dimension) greater than about ½" inch in one case to prevent a person's hand from reaching therethrough). When the tray 24 is in its closed position the frame 12 and the panels 26, 28 thus form a closed or generally closed compartment 48 for storing a product 33.

When the tray 24 is in its closed position the support portion 25 of the tray 24 may not be able to be accessed (e.g. manually accessed in one case), and more particularly may not be able to be accessed from the retrieval side 16 and/or stocking side 18. Instead, if access to the support portion 25 and/or products 33 stored thereon is desired the tray 24 must be moved in either direction to an extended position where one of the panels 26, 28 is positioned sufficiently outside/beyond the associated opening 20, 22 to provide access from one of the sides 16, 18. For example, FIG. 1 illustrates a configuration in which the trays 24 labeled "1" and "6" are in an extended position on the retrieval side 16, and access is provided to the contents of trays 24 from the retrieval side 16.

One or both panels 26, 28 may be made of generally opaque material. One or both panels 26, 28 may be formed of or include a window 44 of a transparent or translucent material such as glass, plastic, or acrylic to permit viewing of the contents of the tray 24 when the trays 24 are in their closed positions. Moreover, in embodiments including a plurality of trays 24, the trays 24, and more particularly the panels 26, 28, may include identifying indicia 46 such as alphanumeric characters or other symbols, color coding, or other characteristics to differentiate various trays 24 so that users on either side 16, 18 can readily identify a target tray 24. Each tray 24 may include the same, or in some cases different, indicia on both of its associated panels 26, 28. Alternately, the indicia 46 or other identifying features for the trays 24 may be positioned on portions of the frame 12 proximate to the passageways 14 in which the trays 24 are positioned or other appropriate locations.

If desired, one or more, or each tray 24, can lack a panel 28 proximate to the stocking side 18 of the frame. In this case the stocking party may be provided with unimpeded access to the support portion 25 of the tray 24 at all times. Controlling access to the support portion 25 of the trays 24 may be less important on the supply side, such as when relatively low value products 33 are dispensed. However, in some cases, such as when relatively high value products 33 are dispensed, it may be desired to utilize the panels 28 to control/limit unauthorized access by the stocking party.

Each tray 24 may also include a pair of opposed, spaced apart vertically oriented side panels 31 (FIGS. 1, 5 and 6). Each side panel 31 can extend along the sides of the tray 24 between the panels 26, 28 to thereby create a containment area about the support portion 25. The tray 24/product support portion 25 may thus be adapted to receive a removable insert 40 positioned on/in the support portion 25. For example, the insert 40 can define the recess 42 in the illustrated embodiment. The removable inserts 40 may be adapted to receive particular types of products 33, and differently-shaped inserts 40 can be used to accommodate different types of products 33 to improve presentation or safety. The inserts 40 can also be removable for easy cleaning, sterilization or replacement without having to remove the support portion 25 from the frame 12. Alternately, the support portion 25 itself may be shaped to provide such functionality without a separate insert 40.

In some cases, the system 10 may be configured or arranged such that the retrieving party only has access to the retrieval side 16 of the frame 12, and does not have access to the stocking side 18. For example, the frame 12 may be positioned in a wall, partition or the like (not shown), and closely received in a correspondingly-sized opening in the wall, partition or the like to prevent a retrieving party from accessing the stocking side 18 of the frame 12. In other cases the frame 12 may be positioned on a counter (such as a service counter in a fast food or quick service counter, or otherwise adjacent to a restricted access area) in which the retrieving party's access to the stocking side 18 is blocked simply by the width/positioning of the counter and/or frame 16, and/or by the understanding that stocking side 18 is not supposed to be accessed by a customer. In this manner a stocking party can position products 33 to be dispensed in the system 10 from the stocking side 18. The products 33 can then reside in the frame 16 until the products 33 are accessed by a customer/retrieving party only on the retrieval side 16.

Figure 10:
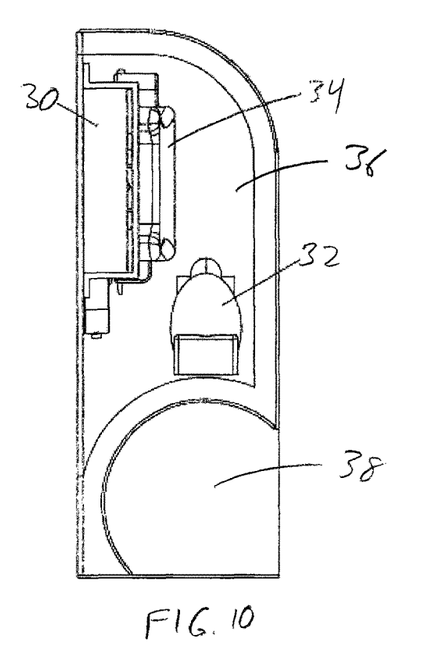
FIG. 10 is a side cutaway view of the interior of an electronics enclosure of the system of FIG. 1.
Figure 13:
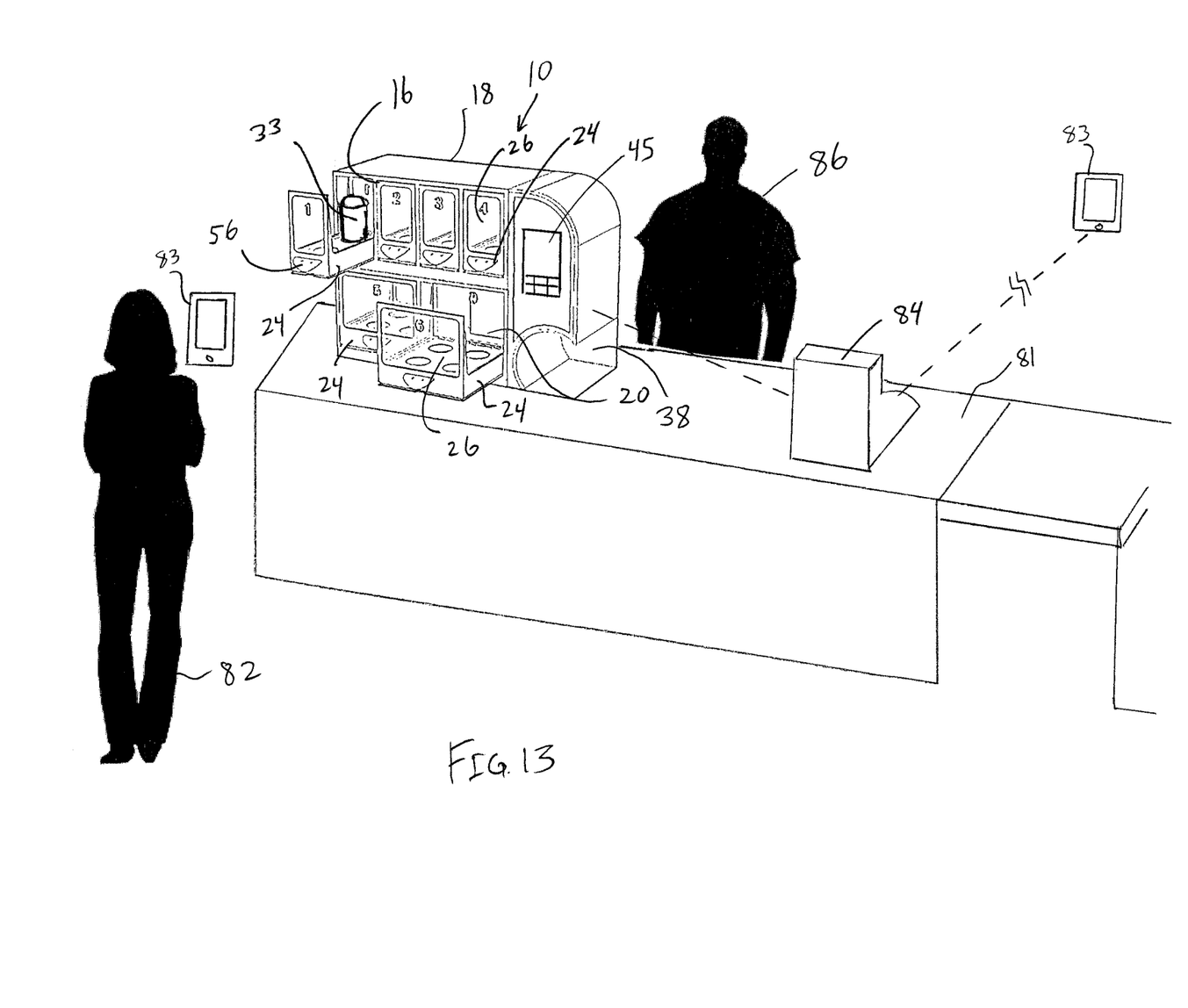
FIG. 13 is a schematic representation of a retail setting in which the system of FIG. 1 may be utilized.

The order fulfillment system 10 can be configured to selectively control access to the product support portion 25 of the trays 24 from users or retrieval parties on the retrieval side 16 of the frame 12, the stocking side 18 of the frame 12, or both, by allowing and/or restricting movement of the tray 24 through the associated passageway 14. In one case, the order fulfillment system 10 may have and/or be operatively coupled to a controller 30 (FIG. 10). The retrieving party may be able to interact with the controller 30 to gain access to the product support portions 25 of the appropriate/authorized tray(s) 24. The controller 30 may include or take the form of a processor, CPU, computer or the like, and may include or be operatively coupled to a sensor such as a scanner 32 and/or a user interface 45 (FIG. 13) in the form of a keypad, touch screen, keyboard, mouse, track ball, audio input device, or the like. The user interface 45 is shown in FIG. 13 as being positioned on the retrieval side 16, but the user interface 45 could instead or in addition be positioned on or accessible from the stocking side 18, or have various other positions. The controller 30 may be operatively connected to a router 34 to facilitate interne access.

The system 10/frame 12 may include, be attached to, and/or be positioned proximate to an enclosure 36 (FIGS. 1 and 10) that houses the controller 30, scanner 32, router 34, and/or other electrical and/or electronic components. The enclosure 36 may include an aperture 38 configured to receive components to be scanned therein, such as a mobile device, a printed or electronic receipt, a hand or finger for biometric identification, or the like. In this manner the component to be scanned can be inserted into aperture 38 by the retrieving party (or, in some cases, by the stocking party) for scanning/authentication by the scanner 32 or other sensor. The scanner 32 or other sensor can then provide its output to the controller 30, which can then provide access/permission to the retrieving party (or denial, if appropriate) to retrieve product(s) 33 from appropriate tray(s) 24 of the order fulfillment system 10.

In one embodiment, upon grant of access to a particular tray 24 via the controller 30, that tray 24 and/or the indicia 46 thereon, may automatically illuminate, flash, partially or fully open, or provide some other type of sensory output/effect to expedite identification of that tray 24. Instead of or in addition to the scanner 32/sensor, the identification/authentication can be implemented or carried out in a variety of manners, including by the use of a user identification and/or password (such as via the user interface 45), the use of a key fob or other wireless device which transmits in the radio frequency range, a mechanical or electronic key, the use of a mobile phone or device, a card with a magnetic strip in conjunction with a magnetic strip/card reader, through receipt of payment via cash or credit card, or various other means or mechanisms.

Referring now to FIGS. 3-9, the order fulfillment system 10 may include one or more electronic and/or mechanical access control/restriction mechanisms to restrict and/or allow access to the contents of the tray 24 by the stocking and retrieving parties. Generally, the stocking party may have broad or greater access to many or all of the trays 24 from the stocking side 18 of the frame 12. In contrast the retrieving party's access from the retrieval side 16 of the frame 12 may be more limited and/or strictly limited to the particular tray(s) 24 which contains a product 33 that the retrieving party is authorized to accesses or possess (for example, after verification by the controller 30 of payment for the product 33). However, access may alternately be more strictly or loosely controlled on either side 16, 18 of the frame 12 as appropriate for the particular application.

Figure 8:
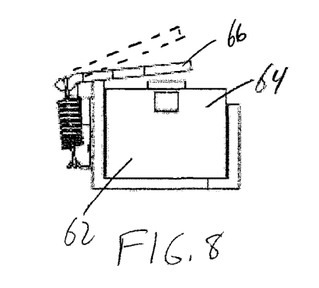
FIG. 8 is a side view of a solenoid which can be utilized in the system of FIG. 1.

With reference to FIGS. 3 and 8, the order fulfillment system 10 may include, for each passageway 12/tray 24, a solenoid, transducer, or other activatable component 62 associated therewith and operatively coupled to the controller 30 to control access to the contents of the tray 24. The solenoid 62 includes a body 64 which may be positioned within the frame 12 beneath the roller assembly 50 of the tray 24, and a plate 66 which is movable between a retracted position where the plate 66 is positioned adjacent the body 64 (shown in solid lines in FIG. 8) and an extended position (shown in dashed lines in FIG. 8) where the plate 66 extends upwards through an aperture 68 (FIG. 7) of the roller assembly 50. Accordingly, when the plate 66 is in the extended position and a retrieving party on the retrieval side 16 attempts to move the tray 24 to the first extended position and gain access to an associated product 33 (with reference to FIG. 3, pulling handle 56 to the left), a stop 70 at the edge of the roller assembly 50 contacts the plate 66, which prevents such attempted extraction of the tray 24. The plate 66 and stop 70 may be configured to block movement of the tray 24 to the first extended position when the plate 66 is raised, but allow movement of the tray 24 toward the second extended position. Alternately, the plate 66 and stop 70 may be configured to block movement of the tray 24 in either direction away from its closed position (e.g. block movement of the tray 24 toward either the first or second extended position).

In contrast, if the plate 66 is in the retracted position, then the plate 66 is not positioned in the aperture 68 and the tray 24 can be moved past the opening 20 on the retrieval side 16 (and/or past the opening 22 on the stocking side 18) to enable the retrieving party (or stocking party) to access the contents of the tray 24. Thus, the retrieving party (or stocking party) may in some cases only access the contents of the tray 24 upon satisfaction of all conditions set by the controller 30 to set the solenoid 62/plate 66 to the retracted position. The controller 30 could also be human-controlled, where a person provides direct instructions to the controller 30 to unlock the tray 24 after, for example, identifying the purchaser and processing payment.

Figure 9:
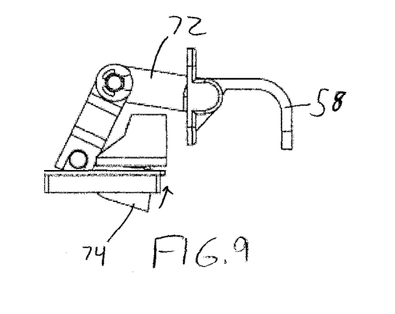
FIG. 9 is a side view of a latch assembly of the system of FIG. 1.

With reference to FIGS. 3, 7, and 9, the order fulfillment system 10 may include, for each passageway 12/tray 24, a latch assembly 72 to control access to the contents of the tray 24 from the stocking side 18 of the frame 12. The latch assembly 72 may include one or more levers (including, in one embodiment, the handle 58), hinges, and/or springs 73 operatively connected to a stop 74. The stop 74 may be spring-loaded and biased to extend through an opening 76 of a pivot plate 78 positioned within the channel 60 of the roller assembly 50 (FIG. 7), and receivable in a recess 80 (FIG. 3) within the frame 12. Accordingly, the stop 74 has a blocking position, as shown, where the stop 74 of the latch assembly 72 is positioned within the recess 80 to prevent movement of the tray 24 through the opening 22 on the stocking side 18 of the frame 12 (e.g., with reference to FIG. 3, movement of the tray 24 to the right is blocked). In some cases, movement of the tray 24 in only a single direction (either single direction) is blocked when the latch assembly 72 is in its blocking position. Alternately, movement of the tray 24 in both directions is blocked when the latch assembly 72 is its blocking position.

The latch assembly 72/stop 74 also has an open position, where the latch assembly 72 is operated, against the spring bias 73, to retract the stop 74 out of the recess 80 of the frame 12 (e.g. the stop 74 is pivotable in the direction of the arrow in FIG. 9). In this case the latch assembly 72 may thereby permit unrestricted movement of the tray 24 out from the passageway 14 through the opening 22 on the stocking side 18 of the frame 12 and/or retrieval side 16. In the depicted embodiment of the latch assembly 72, the stop 74 is biased to the blocking position as its default position, and when the handle 58 is depressed, the stop 74 is retracted upwards out of the recess 80 to transition to the open position.

It should be appreciated that both the specific activatable component 62 and the manually-operated latch assembly 72 (which together or apart, or in the form of various other mechanisms or devices, can constitute an access control system) could alternately include or take the form of any of a variety of lock and/or release mechanisms. For example, the latch assembly 72 could be replaced with a solenoid similar to that of solenoid 62, but with different control parameters, such as a pressure or force sensor or other sensor, a push button, a keypad, or the like that ensures that the latch assembly 72 is in the retracted position when the restocking party requires access to access the tray 24 for restocking. The latch assembly 72 and/or activatable component 62 may be operatively connected to and controlled by the controller 30. In this manner the latch assembly 72 and/or activatable component can also control access to the tray 24 on the stocking side 18 such that the stocking party may be required to provide identification or otherwise be authenticated prior to being able to move a tray 24 and/or gain access thereto.

One embodiment of an ordering process incorporating or utilizing the order fulfillment system 10 will now be described, in the exemplary context of a fulfilling an order for a beverage at a coffee shop, with reference to FIG. 13. The order fulfillment system 10 is, in this example, positioned within the coffee shop with the stocking side 18 of the frame 12 facing a restricted access area, for example facing behind the service counter 81, and the retrieval side 16 of the frame 12 facing a location accessible to the public. In the default/starting configuration, all of the trays 24 are in their closed positions with all of the panels 26, 28 generally aligned with their associated openings 20, 22 of their respective passageways 14. Each solenoid 62 is in the extended position with the plate 66 preventing extension of each associated tray 24 past the opening 20 on the retrieval side 16. In addition the stop 74 of each latch assembly 72 is in the blocking position to prevent extension of the tray 24 past the opening 22 on the stocking side 18.

A customer/retrieving party 82 can place an order with the coffee shop at a location remote from the shop, or other than in a face-to-face transaction, for example through an internet website, a mobile application, a phone call, a fax order, or the like. FIG. 13 illustrates a remotely positioned mobile phone 82 for placing such an order. Alternately, the order can be place via an in-person interaction with an on-site cashier, and the order can be fulfilled using the system 10 and method described herein, or the order can be placed on-site using a mobile device 82, etc. The order can be automatically or manually inputted into a computer system, point-of-sale device, etc. 84, which can be in communication with the system 10/controller 30.

A barista 86 (e.g. the stocking party) prepares the beverage 33, and once complete, prepares to load the beverage 33 into one of the plurality of trays 24 of the order fulfillment system 10 from the stocking side 18 of the frame 12. In one embodiment, the controller 30 selects the appropriate tray 24 for the barista 86 to use based upon size of the product 33, availability of the tray 24, expected pick-up time, accessibility/location of the tray 24, etc. The controller 30 then identifies the automatically selected tray 24 to the barista 86 via a video display/user interface 45, indicia 46 on the frame 12, or the like. In an alternate embodiment, the barista 86 selects the tray 24 to be used and provides the tray identity information to the controller 30 via a user interface 45 such as a keyboard/keypad, touch screen, or other user input device, or the controller 30 may be able to automatically sense which tray 24 has been selected and/or used.

To access the appropriate tray 24 and insert the beverage 33, the barista 86 depresses the handle 58 to activate the latch assembly 72. This movement of the handle 58 moves the stop 74 to the open/retracted position, and the barista 86 then pulls the tray 24 through the passageway 14 until the panel 28 and at least a portion of the product support portion 25 of the tray 24 extend past the opening 22. When the tray 24 is thus in its second extended position, the barista 86 is thereby provided direct manual access to the product support portion 25, and/or insert 40/cup holder 42 contained thereon. The barista 86 then positions the beverage 33 within the cup holder 42, and slides the tray 24 back towards the frame 12 until the tray 24 has returned to the closed position with the stop 74 of the latch assembly 72 back in the blocking position.

In one embodiment, the barista 86 then uses the user interface 45 to indicate to the controller 30 that the beverage 33 is positioned within the closed compartment 48, defined collectively in one case by the tray 24 and the frame 12, and ready for retrieval by the customer/retrieving party 82. In another embodiment, the order fulfillment system 10 includes sensors in communication with the controller 30 to automatically determine that the beverage 33 is ready for retrieval. For example, the latch assembly 72 may include sensors that indicate to the controller 30 when the latch assembly 72 is opened and closed. The controller 30 may be programmed to recognize that for an assigned tray 24, opening the tray 24 from the stocking side 18 followed by closing the tray 24, indicates that an order is ready for pick up. Alternately, or in addition, the tray 24 may include weight sensors, cameras, and/or other types of sensors in communication with the controller 30 to automatically determine when an order is stocked.

The controller 30 may signal to the retrieving party 82 that the beverage order is complete, for example with an email, text message or other contact via mobile device 83, audio or visual signal, through interaction with a vibrating signal device, providing an output from or one the frame 12 and/or tray 24, or any of a variety of other signaling methods. The tray 24 and/or the indicia 46 thereon may illuminate, flash, make a sound, or otherwise provide additional signals to direct the customer to the proper tray 24 containing the customer's order. The signal from the controller 30 may also include additional information for the retrieving party 82, such as the identity of the specific tray 24 which contains the order, a summary of the order contents, the amount of the payment due, a receipt indicating payments made, instructions or information for retrieval of the order (such as providing access codes or a scannable code), and the like. If the retrieving party 82 does not retrieve the order within a predefined period of time, for example, 5, 10, 15, or 30 minutes, the controller 30 may send a follow-up alert to the retrieving party 82 and/or coffee shop personnel/stocking party 86 to indicate that the order has not been collected.

In any case, once the order it stocked, the customer 82 approaches the order fulfillment system 10 from the retrieval side 16 of the frame 12. Even though the customer's order is prepared, the trays 24 may be locked from the retrieval side 16 by the solenoid 62, and the controller 30 can control the customer's access to the appropriate tray 24. The controller 30 can prevent movement of the tray 24 toward the retrieval side 16 unless and until the controller 30 determines that an approved transaction has occurred, or the controller 30 otherwise receives information regarding approval of the transaction and/or dispensing. For example, the customer 82 may place the order remotely, but provide payment on-site, in which case the order may be stocked but not be made accessible unless and until payment is made.

The customer 82 may gain access to the tray 24 in any of a variety of ways. In one embodiment, the customer is provided with a scannable code on a purchase receipt, which may be printed or electronically displayed on a mobile device, such as mobile device 83 in FIG. 13 shown associated with the customer 82 inside the store. The customer 82 may then insert the paper or device with the scannable code into the aperture 38 of the enclosure 36 in proximity to the scanner 32. If the controller 30 accepts the code, access is granted. Alternately, the retrieving party 82 may be provided with an access code or password, such as by including the code on the receipt and/or by text message, email, etc. The controller 30 may include and/or be operatively connected to a user interface 45 such as a keypad or a touchscreen, where the retrieving party 82 may enter the access code to authenticate access rights. Further alternately, access may be granted by any of a variety of other methods, including insertion of an authentication token, presentation of a key fob or other wireless device which transmits in the radio frequency range, a mechanical or electronic key, a card with a magnetic strip in conjunction with a magnetic strip/card reader, the use of biometrics, through insertion of currency (similar to a vending machine), providing a code or password, or any other method known in the art.

Once the controller 30 verifies/authenticates the customer and/or grants access, the controller 30 moves the plate 68 to the retracted position. This (or other action, as desired) thereby permits the customer 82 to use the handle 56 on the retrieval side 16 of the frame 12 to freely move the tray 24 until at least a portion of the product support portion 25 of the tray 24 is positioned past the opening 20. In one embodiment, the tray 24 may automatically fully or partially open upon controller 30 authorization. Once the tray 24 is open, the customer may manually access and retrieve the beverage order 33 from the tray 24 to complete the transaction.

In one embodiment, the controller 30 grants access only a single time per order, such that once the tray 24 has been opened and closed from the retrieval side 16 of the frame 12, the solenoid 62 resets to move the plate 66 back to the extended position. Accordingly, the tray 24 is then indicated to be ready for use for another order. Optionally, the system 10 may include sensors to monitor whether the product 33 has actually been removed from the tray 24. In one embodiment, the order fulfillment system 10 may send an alert or message (e.g., an audio or visual signal, or digital signal via email, push, web, sms, etc.) if the tray 24 is not closed after order retrieval, to notify the stocking party 86. In another embodiment, the tray 24 and/or the frame 12 may include a mechanism to automatically retract the tray 24 after the order is retrieved.

Accordingly, the order fulfillment system 10 facilitates efficient self-service customer retrieval of goods, including remotely-purchased and/or remotely-ordered goods. A seller can remotely accept orders and/or payment for such orders from a plurality of customers, and then prepare each order for customer pickup in a secure manner without the need for interpersonal interaction with the customer and without the need to locate and provide each customer's particular order upon the customer's arrival. The system 10 thus enables both organization and segregation of each order into a different tray 24, and also provides security to ensure that customers only retrieve the order(s) for which they have paid. The system and method saves time and improves efficiency for the remote customer, who can, in some embodiments, self-retrieve purchased products upon arrival at the sale site without having to interact with store personnel. Efficiency is also improved for the seller who does not need to dedicate personnel to locate and provide the order to the customer upon the customer's arrival. Efficiency is also improved for other on-site customers who might otherwise experience increased wait time due to personal interactions to provide completed orders to remote-order customers.

It should be appreciated that the basic principles of the order fulfillment system 10 may be implemented in a variety of manners that depart in certain ways from the embodiments expressly depicted herein. For example, instead of trays 24, the frame 12 may be equipped with a movable/retractable door positioned in each openings 20, 22 of the passageway 14 to restrict access to the interior of the passageway 14. Access through one or both of the doors could be controlled in a manner similar to that described above, for example with respect to the controller 30, solenoid 62 and/or latch system 72, to selectively restrict or allow access to the passageway 14 from the various sides 16, 18 of the frame 12. The doors could be hingedly attached to the frame 12, or alternatively be vertically movable along a set of rollers similar to a garage door, etc.

Although the invention is shown and described with respect to certain embodiments, it should be clear that modifications will occur to those skilled in the art upon reading and understanding the specification, and the present invention includes all such modifications.

What is claimed is:

1. An order fulfillment system comprising:
a frame defining a passageway;
a tray positionable in the passageway such that the tray is movable between a first extended position wherein the tray is positioned at least partially outside the frame on a first side thereof and a second extended position wherein the tray is positioned at least partially outside the frame on a second, opposite side thereof, the tray including a panel configured to generally block the passageway when the panel is positioned in or adjacent to the passageway; and
a controller configured to selectively allow or block movement of the tray to or from at least one of the first or second extended positions, wherein the system lacks a door pivotally coupled to the frame that can entirely cover the passageway.

2. The system of claim 1 wherein the tray includes a supplemental panel configured to generally block the passageway when the supplemental panel is positioned in or adjacent to the passageway, wherein the supplemental panel is positioned at an opposite end of the tray relative to the panel, and wherein the tray includes a pair of side panels, each side panel being oriented generally perpendicular to the panel and the supplemental panel, and wherein each side panel has a shorter height than the panel and the supplemental panel.

3. The system of claim 2 wherein the panel and the supplemental panel are each configured to block an associated opposite end of the passageway when the tray is in a closed position and generally entirely positioned in said passageway.

4. The system of claim 1 wherein the tray is movable in a direction of movement when moving between the first and the second extended positions, and wherein the panel is oriented generally perpendicular to said direction of movement.

5. The system of claim 1 wherein the frame defines a plurality of passageways and each passageway includes a tray positioned therein.

6. The system of claim 5 wherein the controller is configured to receive an electronic input relating to a storage position of an item to be dispensed positioned in one of the passageways.

7. The system of claim 5 wherein the controller is configured to receive an input relating to a proof of purchase of an item to be dispensed and to provide access to at least one of the trays corresponding to the item.

8. The system of claim 1 wherein the system is configured such that an item to be dispensed is insertable into the passageway and onto the tray in a first direction at a first end of the passageway, and wherein the item is thereafter removable from the passageway in the first direction at a second opposite end of the passageway.

9. The system of claim 1 wherein the tray is positionable in a closed position where the tray is positioned entirely in the passageway.

10. The system of claim 9 wherein the panel has a cross sectional area that is about equal to but smaller than a cross sectional area of a portion of the passageway in which the panel is located when the tray is in the closed position to generally block the passageway.

11. The system of claim 9 wherein the panel is generally aligned with an outermost surface of said frame when the tray is in the closed position.

12. The system of claim 9 wherein the tray includes a handle coupled thereto and configured to protrude outwardly from a front face of the frame when the tray is in the closed position.

13. The system of claim 1 wherein the controller is configured to block movement of the tray to the first extended position but to allow movement of the tray to the second extended position unless the controller determines that an approved transaction has occurred or unless the controller receives information that an approved transaction has occurred, after which the controller allows movement of the tray to the first extended position.

14. The system of claim 1 wherein the tray is manually movable between the first and second extended positions when allowed by the controller.

15. The system of claim 1 wherein said passageway continuously extends an entire thickness dimension of said frame and said controller is operatively coupled to said tray.

16. The system of claim 1 wherein said tray is positionable in a closed position wherein said tray is generally positioned in said frame, and wherein said system is configured to prevent said tray from moving to at least one of said extended positions unless said controller authorizes such movement.

17. The system of claim 1 wherein said passageway extends continuously entirely through said frame in a direction parallel to movement of said tray in said passageway.

18. The system of claim 1 wherein said tray has a length in a direction parallel to movement of said tray in said passageway, wherein said passageway has a length in said direction parallel to said movement of said tray in said passageway, and wherein said length of said tray is about equal to said length of said passageway.

19. The system of claim 18 wherein the tray is positionable in the first extended position wherein a majority of the length of the tray protrudes outwardly from the frame and the tray is stably retained in the first extended position.

20. The system of claim 1 further comprising an access control system, at least part of which is positionable in the passageway, wherein the access control system is operatively coupled to the controller to selectively allow or block movement of the tray to or from at least one of the first or second extended positions.

21. The system of claim 20 wherein said part of said access control system positionable in the passageway is positioned directly below said tray when said tray is entirely positioned in said passageway.

22. The system of claim 1 wherein the controller is configured to selectively allow or block movement of the tray to both the first and second extended positions.

23. The system of claim 1 wherein the system lacks a door pivotally coupled to the frame that can at least partially cover the passageway.

24. A dispensing system comprising:
a frame having a first side and a second opposite side, the frame having a compartment continuously extending therethrough with a first opening and a second opening at opposite ends thereof, wherein the compartment is configured to receive an item therein from the second side of the frame through the second opening;
a tray movably positionable in the compartment, wherein when positioned in the compartment the tray is movable between a first extended position wherein the tray is positioned at least partially outside the frame on the first side of the frame and a second extended position wherein the tray is positioned at least partially outside the frame on the second side of the frame; and
a controller configured to selectively allow or block movement of the tray wherein the system lacks a door pivotally coupled to the frame that can entirely cover the passageway.

25. The system of claim 24 further comprising an access control system, at least part of which is positionable in the passageway, wherein the access control system is operatively coupled to the controller to selectively allow or block movement of the tray to or from at least one of the first or second extended positions.

26. The system of claim 24 wherein the tray is configured such that when the tray is positioned in the compartment the tray is positionable in a closed position wherein the tray is positioned entirely in the passageway, and wherein the system further includes an access control system, at least part of which is positionable in the passageway, wherein the access control system is operatively coupled to the controller to selectively allow or block movement of the tray away from the closed position.

27. The system of claim 24 wherein the tray includes a support portion and a pair of panels extending upwardly from the support portion such that the tray is generally "U" shaped in side view.

28. The system of claim 24 wherein the system lacks a door pivotally coupled to the frame that can at least partially cover the passageway.

29. A method for fulfilling an order comprising:
receiving an order for an item;
accessing a system including a frame having or defining a passageway, the system further including a tray positioned in the passageway, and a controller configured to selectively allow or block movement of the tray, wherein the system lacks a door pivotally coupled to the frame that can entirely cover the passageway;
moving the tray to a first position wherein the tray is positioned at least partially outside the frame on a first side thereof;
placing the item on the tray while the tray is in the first position; and
the controller receiving authorization information to enable the tray to be moved to a second position wherein the tray is positioned at least partially outside the frame on a second, opposite side thereof, to enable removal of the item from the system.

30. The method of claim 29 further comprising the step of, after the placing step, moving the tray to a closed position wherein the tray is generally entirely positioned in the passageway, and wherein the controller prevents the tray from moving to the second position until the receiving authorization information step.

31. The method of claim 29 wherein the placing step takes place after the step of the controller receiving authorization information.

32. The method of claim 29 wherein the tray is movable to the second position wherein the tray is positioned at least partially outside the frame on the second side.

33. The method of claim 29 further comprising moving the tray to the second position.

34. The method of claim 29 wherein the system further includes an access control system operatively coupled to the controller, wherein at least part of the access control system is positionable in the passageway, wherein the method further includes the controller operating the access control system to enable the tray to be moved to the second position, and wherein the tray includes a panel configured to generally block the passageway when the panel is positioned in or adjacent to the passageway.

* * * * *